April 23, 1929.　　F. C. FELIX　　1,710,157

CONDUIT FASTENER

Filed Aug. 12, 1922

WITNESSES

INVENTOR
Frank C. Felix
by Christy & Christy
Attys.

Patented Apr. 23, 1929.

1,710,157

UNITED STATES PATENT OFFICE.

FRANK C. FELIX, OF AMBRIDGE, PENNSYLVANIA, ASSIGNOR TO NATIONAL METAL MOLDING COMPANY, OF PITTSBURGH, PENNSYLVANIA, A CORPORATION OF PENNSYLVANIA.

CONDUIT FASTENER.

Application filed August 12, 1922. Serial No. 581,434.

It is the object of the invention to provide a fastener for conduits, armored cables, etc., at low cost and which may be easily and quickly applied.

Figure 2:
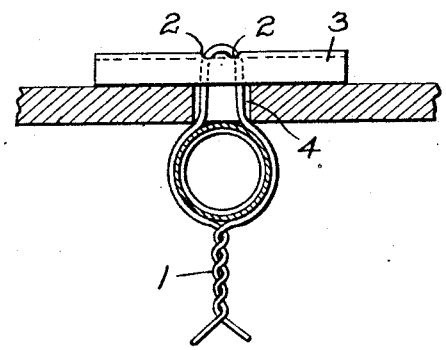
Figure 1:
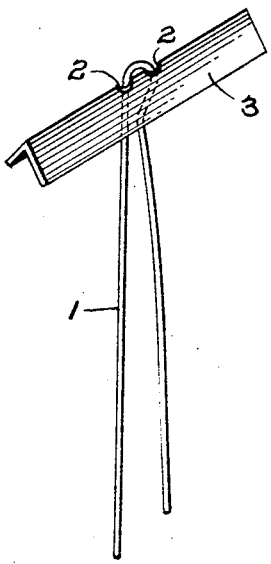

In the accompanying drawings, Figure 1 is a perspective view of the fastener, and Figure 2 is an elevation of it in use.

Heretofore it has been customary to secure conduits, armored cables, etc., to the walls of buildings by means of ordinary pipe straps engaging the conduit and screwed to the wall.

As illustrated herein, the present invention consists in a conduit fastener or hanger comprising two members, a rigid member adapted to be wholly enclosed and fixed within a wall, and a flexible member or members loosely joined to the rigid member and adapted to be caused to engage and support the conduit or cable in contact with or close to the surface of the wall. The second conduit-supporting member is shown in the form of a wire 1, bent upon itself, the two legs of which project through holes 2 in the rigid member 3, so that the two members are movable or tiltable freely with respect to each other. This form of the invention is particularly adapted to use for securing the conduit or cable to a hollow wall, such as a hollow tile. For that purpose an incision or orifice 4 is cut in the hollow wall; then the rigid member is inserted through the opening and caused to engage the inner face of the wall. Then in order to secure the conduit or cable the opposite legs of the wire are twisted together around it as shown in Figure 2.

It will be noted that one of the legs of the wire 1 is bent inwardly at the top, the purpose being that the two pieces making up the fastener shall be joined together, so that they will not shake apart in handling or shipment, thus constituting them in combination a definite article of manufacture. Also when the rigid member 3 is of channeled form as shown in Figure 1, the two legs of the wire 1 may be turned into the channel, thus permitting ready insertion of the bar 3 through the hole 4 in the wall and causing it to take the position shown in Figure 2.

I claim as my invention:

A conduit fastener comprising a rigid channeled member adapted to be passed through and to span a hole in a wall, and a U-shaped wire having its opposite legs projected through openings in said rigid member and adapted to be bent around and support a conduit, one of said legs being bent inwardly adjacent to its support whereby said wire member may be folded into the channel of said rigid member and be prevented from separation therefrom.

In testimony whereof I have hereunto set my hand.

FRANK C. FELIX.